(12) United States Patent
Kajiki et al.

(10) Patent No.: US 6,631,161 B1
(45) Date of Patent: Oct. 7, 2003

(54) METHOD AND SYSTEM FOR COMPRESSING MOTION IMAGE INFORMATION

(75) Inventors: Noriko Kajiki, Tokyo (JP); Satoshi Tanabe, Tokyo (JP)

(73) Assignee: Kabushiki Kaisha Office NOA, Tokyo (JP)

( * ) Notice: Subject to any disclaimer, the term of this patent is extended or adjusted under 35 U.S.C. 154(b) by 412 days.

(21) Appl. No.: 09/716,275

(22) Filed: Nov. 21, 2000

(30) Foreign Application Priority Data

Jun. 6, 2000 (JP) .................................... 2000-169680
Jul. 19, 2000 (JP) .................................... 2000-218397

(51) Int. Cl.[7] ............................................... H04N 7/12
(52) U.S. Cl. ........................ 375/240.01; 375/240.24; 382/237
(58) Field of Search ................ 375/240.01, 240.12, 375/240.02, 240.08, 240.24; 348/420.1, 416.1, 409.1, 412.1, 414.1; 382/236, 238, 237, 243–244; 358/261.3, 427, 433

(56) References Cited

U.S. PATENT DOCUMENTS

| | | | |
|---|---|---|---|
| 5,122,873 A | * 6/1992 | Golin | 375/240.23 |
| 5,815,601 A | * 9/1998 | Katata et al. | 382/232 |
| 6,243,418 B1 | * 6/2001 | Kim | 375/240.12 |
| 6,272,253 B1 | * 8/2001 | Bannon et al. | 382/236 |
| 6,373,988 B1 | * 4/2002 | Thorell et al. | 382/240 |
| 6,490,373 B2 | * 12/2002 | Hata et al. | 382/239 |

OTHER PUBLICATIONS

Lee et al., "Binary shape coding using baseline–based method", IEEE Transaction on Circuits and Systems for Video Technology, vol. 9, iss. 1, pp. 44–58, Feb. 1999.*
Bossen et al., "A simple and efficient binary shape coding technique based on bitmap representation", IEEE International Conference on Acoustics, Speech, and Signal Processing, vol. 4, pp. 3129–3132, Apr. 1997.*

* cited by examiner

Primary Examiner—Vu Le
(74) Attorney, Agent, or Firm—Rader, Fishman & Grauer PLLC

(57) ABSTRACT

A motion image information compression system having an entropy coding circuit for reducing redundant information between frames is capable of compressing information such as image information or sound information by means of predictive coding, with a high compression ratio and at a high speed while maintaining high image and sound quality. In this system, comparison of spatially or temporally adjacent pixels to each other and output of differential information are made by the entropy coding circuit. Further, a bit map information storage circuit compares pixels t and corresponding pixels t−1 to each other between frames, detects an area where the absolute values of pixel differences are greater than a given parameter, and stores the detected area and the other area into the form of a 1-bit bit map. An information compression circuit compresses information in the area indicated, by the bit map stored in the bit map information storage circuit, as being greater in the absolute difference value between pixels t and t−1 than a given parameter, and processes pixels in the other area as those having no change between frames.

20 Claims, 4 Drawing Sheets

METHOD AND SYSTEM FOR COMPRESSING MOTION IMAGE INFORMATION

BACKGROUND OF THE INVENTION

1. Field of the Invention

The present invention relates to a method and system for compressing motion image information with a high compression ration and at a high speed.

2. Description of the Related Art

In earlier image signal transmission, an image signal is first converted to another signal and then coded by assigning proper codes selected according to the statistical feature of the converted signal. When the image has high redundancy within a frame, as is the case with an image including a regular pattern or a plain image, there is a high correlation between adjacent pixels, and thus it is possible to predict, to a certain degree, a pixel value to be coded next from a pixel value which has already been coded. Therefore, if components which could not be predicted are extracted, the coding is performed only for those components which could not be predicted, thereby it becomes possible to compress information with a large compression ratio. This technique is called the predictive coding.

In the case of a motion image in a video telephone or the like, images of adjacent frames are very similar to each other, and thus the temporal change is limited. Such temporal redundancy can be removed by means of interframe predictive coding on the basis of interframe prediction. In this case, a block code is generally employed in which one codeword is assigned to one symbol, and one frame is divided into a plurality of pixel blocks so that the luminance difference within each block becomes smaller than within the entire frame. The smaller luminance difference within each block allows compression of information. This technique is called block coding.

Entropy coding is known in the art as a coding technique, which achieves data compression by assigning a high efficiency code to the converted signal. Huffman coding is known as a method for generating a high efficiency code. A representative example of the high efficiency code is an arithmetic code in which a probability numeric line is divided into segments in accordance with the occurrence probability of a symbol system, and a binary decimal number indicating a location in a segment is employed as a code for the symbol system. Codewords are generated one by one by performing the arithmetic process described above.

A three-step block coding system is known in the art as a technique for coding an image signal in an efficient manner. This technique consists of three steps: sampling; conversion; and quantification. In this technique, in order to retain a two-dimensional resolution and high-frequency components of a given image signal, it is generally required to perform sampling at a frequency twice the highest frequency component.

SUMMARY OF THE INVENTION

However, in the conventional image signal compression technique, because the complicated block coding process is employed, it is difficult to compress image data by means of predictive coding with a high compression ratio and at a high speed.

When differential information is compressed in the motion image compression process, that is, when successive values A1 and A2 are predicted to be similar to each other and when the value A1 is known before the value A2 occurs, the difference A2–A1 is regarded as having a value near 0, and compression is performed using the conventional Huffman code or arithmetic code. However, if A1 and A2 can each take one of values 0, ..., n, the difference A2–A1 can have one of 2n+1 values. As a result, it is required to prepare 2n+1 Huffman code words. However, A2 can actually take one of n values, and thus n codes are not used from the local point of view. This circuit that the code includes a large amount of redundancy.

In view of the above problems in the conventional techniques, it is an object of the present invention to provide a method and a system for compressing motion image information by means of predictive coding with a high compression ratio and at a high speed.

According to an aspect of the present invention, there is provided a method of compressing motion image information by means of comparing spatially or temporally adjacent pixels to each other and outputting differential information thereby reducing redundant information between frames, the method including the steps of: comparing corresponding pixels to each other between frames, detecting an area where the absolute values of pixel differences are greater than a given parameter, and storing the detected area and the other area into the form of a 1-bit bit map; and compressing information in the area where the absolute values of pixel differences are greater than the parameter.

According to another aspect of the present invention, there can be provided a method of compressing motion image information by means of comparing spatially or temporally adjacent pixels to each other and outputting differential information thereby reducing redundant information between frames, the method including the steps of: comparing corresponding pixels to each other between frames, detecting an area where the absolute values of pixel differences are greater than a given parameter, and storing the detected area and the other area into the form of a 1-bit bit map; and compressing information in the area where the absolute values of pixel differences are greater than the parameter and processing (deleting) the other area, where the absolute values of pixel differences are not greater than the parameter, as an area where there is no change in pixel value between frames. In this case, the 1-bit bit map information stored in the bit map information storage may be compressed by means of a binary image coding method such as a run length, modified READ (MR, MMR), modified Huffman (MH), or JBIG coding method. Further, the information in the area where the absolute difference values are greater than the given parameter may be compressed by means of an adaptive Huffman coding process including a plurality of Huffman tables as the amount of predicted information.

According to still another aspect of the present invention, there is provided a system for compressing motion image information, including entropy coding means or circuit for reducing redundant information between frames by means of comparing spatially or temporally adjacent pixels to each other and outputting differential information, the system including: bit map information storage means or circuit for comparing pixels t and corresponding pixels t–1 to each other between frames pixel by pixel, detecting an area where the absolute values of pixel differences are greater than a given parameter, and storing the area and the other area into the form of a 1-bit bit map; and information compression means or circuit for compressing information in the area indicated, by the bit map stored in the bit map information storage circuit, as being greater in the absolute difference value between pixels t and t−1 than the parameter P.

According to still another aspect of the present invention, there is provided a system for compressing motion image information, including entropy coding means or circuit for reducing redundant information between frames by means of comparing spatially or temporally adjacent pixels to each other and outputting differential information, the system including: bit map information storage circuit for comparing pixels t and corresponding pixels t−1 to each other between frames pixel by pixel, detecting an area where the absolute values of pixel differences are greater than a given parameter, and storing the area and the other area into the form of a 1-bit bit map; and information compression means or circuit for compressing information in the area indicated, by the bit map stored in the bit map information storage circuit, as being greater in the absolute difference value between pixels t and t−1 than the parameter P, and for processing (deleting) pixels in the other area as those having no change between frames.

Preferably, the 1-bit bit map information stored in the bit map information storage circuit is compressed by means of a binary image coding method such as a run length, modified READ (MR, MMR), modified Huffman (MH), or JBIG coding method.

The information compression means or circuit for compressing information in the area where the absolute difference values are greater than said parameter P may perform information compression by means of an adaptive Huffman coding process including as many Huffman tables as the amount of predicted information.

The entropy coding means or circuit may include adaptive arithmetic coding circuit which has as many arithmetic tables as the amount of predicted information and which performs coding in accordance with an arithmetic table selected from the plurality of arithmetic tables.

According to still another aspect of the present invention, to achieve the above-described object, there is provided a method of compressing motion image information, by means of comparing spatially or temporally adjacent pixels to each other and outputting differential information thereby reducing redundant information between frames, the method including the steps of: comparing pixels treated on a block-by-block basis, each block including 2×2 pixels, with corresponding pixels of another frame, detecting an area where the absolute values of differences are greater than a given parameter, and storing the detected area and the other area into the form of a 1-bit bit map; and compressing information in the area where the absolute values of differences are greater than the parameter.

According to still another aspect of the present invention, to achieve the above-described object, there is provided a method of compressing motion image information, by means of comparing spatially or temporally adjacent pixels to each other and outputting differential information thereby reducing redundant information between frames, the method including the steps of: comparing pixels treated on a block-by-block basis, each block including 2×2 pixels, with corresponding pixels of another frame, detecting an area where the absolute values of differences are greater than a given parameter, and storing the detected area and the other area into the form of a 1-bit bit map; and compressing information in the area where the absolute values of differences are greater than the parameter and processing (deleting) the other area, where the absolute values of pixel differences are not greater than the parameter, as an area where there is no change in pixel value between frames.

When 2×2 pixel data input to an encoder between frames are represented by A, B, C, and D, output data a, b, c, and d may be determined and a 2×2 bitmap may be produced such as a=A+B+C+D, b=A−B+C−D, c =A+B−C−D, and d=a−4D. Furthermore, decoded output data may be produced such as 3A≈a+b+c=3A+B+C−D, 3B≈a−b+c=A+3B−C+D, 3C≈a+b−c=A−B+3C+D, and 3D≈a−b−c=−A+B+C+3D.

Preferably, intraframe difference presence/absence information is given in the form of bitmap information corresponding to respective 2×2 blocks in a frame, wherein it is determined whether there is a difference between frames by comparing the root-mean-square error of (three) data input to an encoder, that is $((A-A')^2+(B-B')^2+(C-C')^2)^{1/2}$, with a parameter, and, if it is determined that there is a difference between frames, a corresponding bit of said intraframe difference presence/absence information is set.

Preferably, the 1-bit bitmap information stored in the bitmap is compressed by means of a binary image coding method such as a run length, modified READ (MR, MMR), modified Huffman (MH), or JBIG coding method.

Furthermore, information in the area where the absolute difference values are greater than the parameter may be compressed by means of an adaptive Huffman coding process including as many Huffman tables as the amount of predicted information.

According to still another aspect of the present invention, to achieve the above-described object, there is provided a system for compressing motion image information, including entropy coding circuit for reducing redundant information between frames by means of comparing spatially or temporally adjacent pixels to each other and outputting differential information, the system including: bitmap information storage circuit for comparing pixels t treated on a block-by-block basis, each block including 2×2 pixels, with corresponding pixels t−1 of another frame, detecting an area where the absolute values of differences are greater than a given parameter, and storing the detected area and the other area into the form of a 1-bit bit map; and information compression circuit for compressing information in the area indicated, by the bitmap stored in the bitmap information storage circuit, as being greater in the absolute difference value between pixels t and t−1 than the parameter.

According to still another aspect of the present invention, to achieve the above-described object, there is provided a system for compressing motion image information, including entropy coding circuit for reducing redundant information between frames by means of comparing spatially or temporally adjacent pixels to each other and outputting differential information, the system including: bitmap information storage circuit for comparing pixels t treated on a block-by-block basis, each block including 2×2 pixels, with corresponding pixels t−1 of another frame, detecting an area where the absolute values of differences are greater than a given parameter, and storing the detected area and the other area into the form of a 1-bit bit map; and information compression circuit for compressing information in the area indicated, by the bitmap stored in the bitmap information storage circuit, as being greater in the absolute difference value between pixels t and t−1 than the parameter, and for processing (deleting) pixels in the other area as those having no change between frames.

Preferably, in this system, the 1-bit bitmap information stored in the bitmap information storage circuit is intraframe difference presence/absence information corresponding to respective 2×2 blocks in a frame, and said intraframe difference presence/absence information is compressed by means of a binary image coding method such as a run length, modified READ (MR, MMR), modified Huffman (MH), or JBIG coding method.

The information compression circuit for compressing information in the area where the absolute difference values are greater than the parameter may perform the information compression by means of an adaptive Huffman coding process including as many Huffman tables as the amount of predicted information.

The entropy coding circuit may include adaptive arithmetic coding means or circuit which has as many arithmetic tables as the amount of predicted information and which performs coding in accordance with an arithmetic table selected from the plurality of arithmetic tables.

The method and system for compressing motion image information according to the present invention are characterized in that pixels are treated on a block-by-block basis, each block including 2×2 pixels, and that the pixels which are spatially or temporally adjacent are compared to each other, and differential information is output thereby reducing redundant information between frames. That is, pixels t in a frame are compared with corresponding pixels t−1 in a previous frame, pixel by pixel, to detect an area where the absolute difference values are greater than the parameter P. The detected area where the absolute difference values are greater than the parameter P and the other area are stored in the form of the 1-bit bit map.

In the entropy coding process, codes which will appear in successive frames are predicted, and small deviations from predicted codes are output thereby reducing the redundancy of information. The other information is compressed by means of adaptive Huffman coding or adaptive arithmetic coding in which coding is performed on the basis of a table selected from a plurality of tables in accordance with predicted information.

DESCRIPTION OF THE PREFERRED EMBODIMENT

Figure 1:
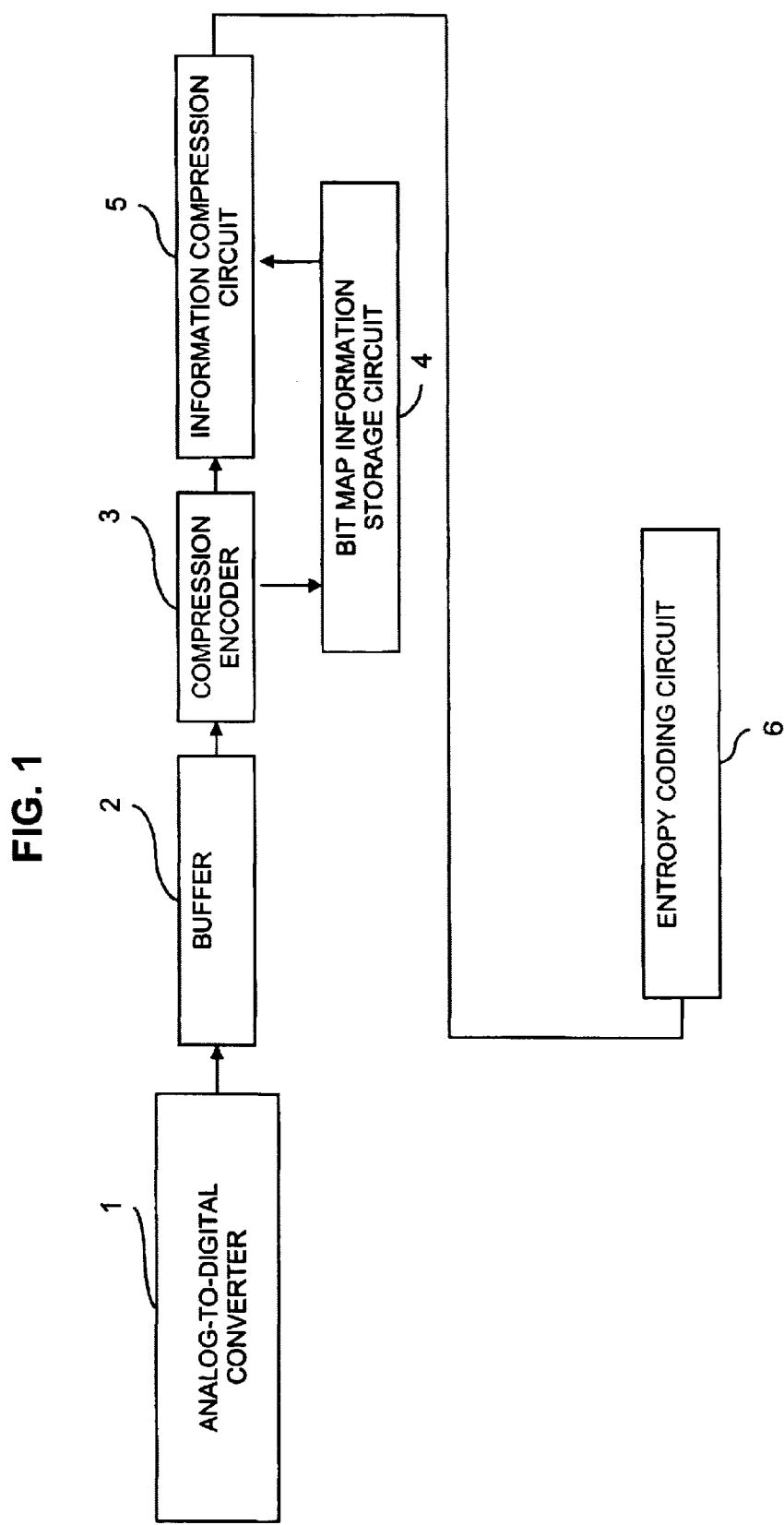
FIG. 1 is a block diagram of a motion image information compression circuit.

The present invention is described in further detail below with reference to an embodiment in conjunction with the accompanying drawings. FIG. 1 is a block diagram of a motion image data compression encoder. A composite analog signal output from a device such as a video cameral, a disk player, or a video cassette player, according to the NTSC standard, is input to an analog-to-digital converter 1 The analog-to-digital converter 1 converts the applied analog signal to a digital signal representing one line of a video frame. The resultant digital signal is stored in a buffer 2. Note that although in FIG. 1, the analog signal output from the NTSC device is converted to a digital signal by the analog-to-digital converter 1 and the resultant digital signal is stored in the buffer 2, the present invention is not limited to the embodiment shown in FIG. 1. The present invention may also be employed to efficiently compress any image signal output from any of various types of devices.

Figure 2:
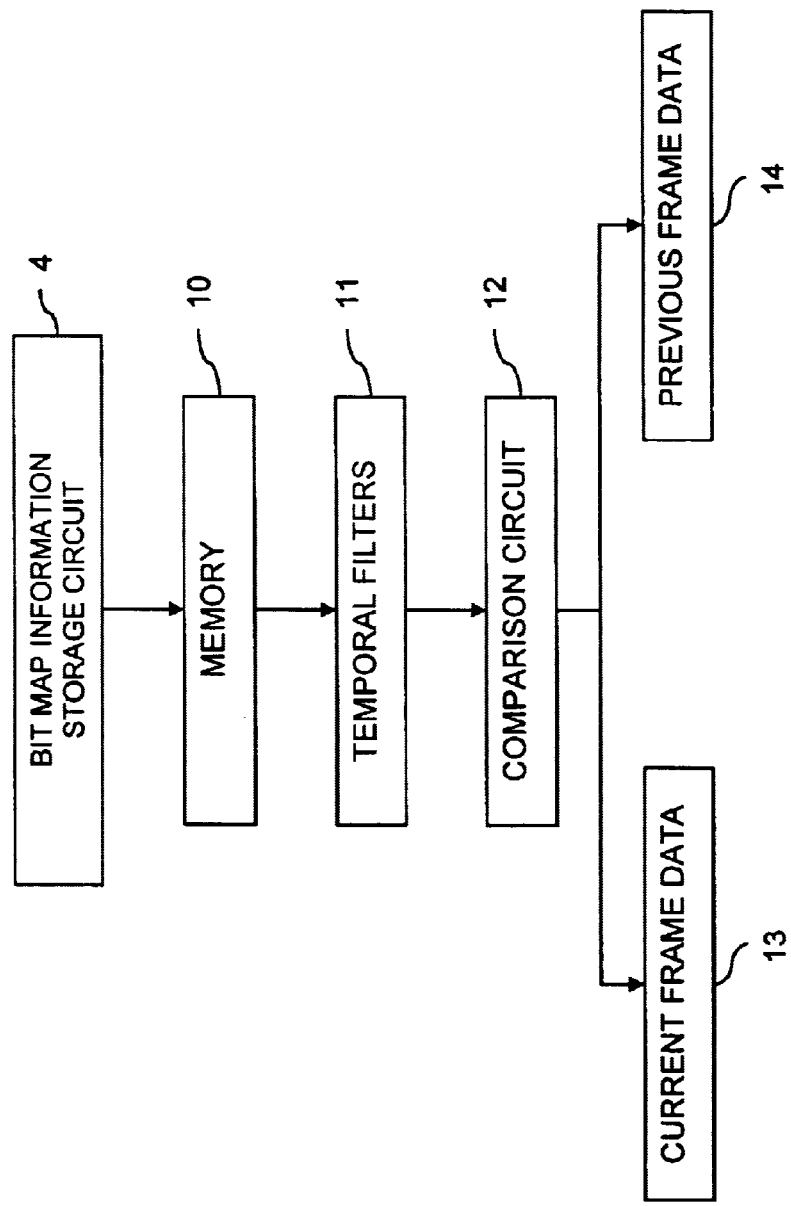
FIG. 2 is a block diagram of a comparing circuit for comparing information stored in bit map information string circuit.

As shown in FIG. 1 or 2, the compression encoder 3 includes bit map information storage circuit 4 which compares pixels t in a frame with corresponding pixels t−1 in a previous frame on a pixel-by-pixel basis and detects an area where the absolute difference values are greater than a given parameter P and the other are where the absolute difference values are not greater than the given parameter P and stores the detected areas in the form of a 1-bit bit map. The comparison between the pixels t and the pixels t−1 is performed in terms of their element (brightness or hue). Herein, t denotes time. That is, pixels (pixels t) in a frame at a current time t are compared with corresponding pixels in a frame (pixels t−1 at locations, in the frame, corresponding to the locations of pixels t−1) at an immediately previous time t−1. The compression encoder 3 further includes information compression circuit 5 which has as many Huffman tables as the amount of predicted information and which compresses information by means of adaptive Huffman coding such that pixels in the area, which is described in the bit map information storage circuit as being not greater in the absolute difference value between pixels t and t−1 than the given parameter P, are processed as those having no change between frames, and information in the other area having absolute difference values greater than the parameter P is compressed. Furthermore, the compression encoder 3 also includes entropy coding circuit 6 for reducing redundant information between frames by means of comparing spatially or temporally adjacent pixels to each other and outputting differential information, wherein the entropy coding circuit may include adaptive arithmetic coding circuit which has as many arithmetic tables as the amount of predicted information and which performs coding using an arithmetic table selected from the plurality of arithmetic tables in accordance with the predicted information.

In the present embodiment, pixels are grouped into blocks each including 2×2 pixels and treated on a block-by-block basis. When data A, B, C, and D are input to a compression encoder 3, the compression encoder 3 determines output data as a, b, c, and d. Bitmap information storage circuit 4 then produces a bitmap in the form of a 2×2 matrix in which output data a, b, c, and d are represented by rounded values such as a=A+B+C+D, b=A−B+C−D, c=A+B−C−D, and d=a−4D. The resultant output data is stored in the entropy coding circuit 6 or transmitted. The data will be decoded, by decoding circuit which will be described later, such that 3A≈a+b+c=3A+B+C−D, 3B≈a−b+c=A+3B−C+D, 3C≈a+b−c=A−B+3C+D, and 3D≈a−b−c=−A+B+C+3D. Thus, it is possible to reproduce an image using as small as ¾ of data so that the resultant reproduced image becomes similar to that obtained by filtering its original image as described below. For example, when A(3, 1, 1, −1) is given as input data, reproduced data will have an intermediate property between that obtained via a smoothing filter (1, 1, 1, 1) and that obtained via an edge extraction filter (4, −1, −1, −1) (more similar to that obtained via the and edge extraction filter), and a ¼ error is diffused over the entire data. Similarly, in encoded output data (a, b, c, d), en error is diffused over the entire 2×2 block, thereby preventing abrupt degradation in image quality.

After completion of the encoding process, pixel data of each frame is sent to a memory 10 in the bit map information storage circuit 4 and stored therein as previous-frame data for one frame period. Thereafter, the pixel data stored in the memory 10 is filtered by a temporal filter 11 serving as a time variable impulse response filter. After the filtering, the current frame data 13 and the previous frame data 14 are examined by the compression encoder 3 in terms of redundancy between frames and the difference between them is calculated. That is, comparison circuit 12 compares the respective coded pixel values with the values of the corresponding pixels of the previous frame. Each pixel is added with a single-bit mark indicating whether the pixel is a new one or the same as the previous pixel. In this process, a frame bit map is produced such that each pixel is mapped by one bit. Herein, the bit maps of the respective frames are distinguished from each other by means of comparison between frames.

In the present embodiment, it is determined whether there is a difference between frames by comparing the root-mean-square error of (three) input data with a threshold value. More specifically, $((A-A')^2+(B-B')^2+(C-C')^2)^{1/2}$ is compared with a parameter. If it is determined that there is a difference between frames, a corresponding bit of intraframe difference presence/absence information is set (to 1). Herein, the intraframe difference presence/absence information is given in the form of bitmap information corresponding to respective 2×2 blocks in a frame, and the intraframe difference presence/difference information is compressed by means of a known compression method such as a run length coding method which will be described later. Furthermore, the thresholding process is also performed upon, for example, b and c of the output data (a, b, c, d). That is, when the absolute value of a difference is not greater than a parameter P given as the threshold value, the difference is regarded as being equal to zero.

The 1-bit bit map information stored in the bit map information storage circuit 4 is compressed by a binary image coding technique such as a run length, modified READ (MR, MMR), modified Huffman (MH), or JBIG method. In the case of a binary document image treated by a facsimile machine or the like, there is a high probability that white or black pixels successively appear in one or more continuous areas. Thus, in the run length coding method, one-dimensional segments called runs which include only white or black pixels are employed as units of coding, and the number of pixels included in each run, that is, the length of each run, is employed as a code. For example, in digital facsimiles using a public telephone network, a modified Huffman code is generally used in which the run length model is established separately for black and white pixels.

The modified Huffman coding (MH) is employed as a one-dimensional coding method in facsimile transmission in which an original image is scanned at a pixel density of, for example, 8 pixels/mm thereby obtaining black-and-white pixel information including 1728 pixels per scanning line. The MH code represents the run length, that is, the length of each segment including only white pixels (white run) or only black pixels (black run). Variable length codes are assigned to the respective runs using the statistical tendency that white or black runs having particular lengths occur more frequently than the other lengths, thereby reducing the amount of data.

The modified READ (MR, MMR) method is widely used as a technique for performing two-dimensional coding in addition to the one-dimensional coding. In the NR method, up to one successive scanning line with the normal resolution or up to three successive scanning lines with the high resolution are two-dimensionally coded after being one-dimensionally coded. In the NMR method, the MR method is expanded for the infinite number of scanning lines for both the normal and high resolutions.

The method and system for compressing motion image information according to the present invention are characterized in that pixels which are spatially or temporally adjacent are compared to each other, and differential information is output thereby reducing redundant information between frames. That is, as shown in FIG. 2, pixels t in a frame are compared with corresponding pixels t−1 in a previous frame pixel by pixel to detect an area where the absolute difference values are greater than the parameter P. The detected area where the absolute difference values are greater than the parameter P and the other area are stored in the form of the 1-bit bit map. The entropy coding circuit 6 predicts codes which will appear within a frame and in successive frames, respectively, and outputs small deviations from the predicted codes thereby reducing the redundancy of information. Herein, it is known that when an image signal is coded by means of code assignment and the coded signal is transmitted, the average code length per pixel does not become equal to or less than the average amount of information (entropy).

The algorithm of the adaptive Huffman coding method is described below. In the adaptive Huffman coding method, the predictive coding process including the generation of differential information and the Huffman coding is performed in one step thereby achieving an improvement in the codeword efficiency. In the conventional Huffman coding process, codewords are generally produced using a single Huffman table. In the dynamic Huffman coding, the Huffman table is updated each time one word is coded. In contrast, in the adaptive Huffman coding, there are as many Huffman tables (code tables) as the amount of predicted information, and a proper table is selected by a table selector from the plurality of tables. The coding is performed using the selected table. Thus, data such as image information or audio information is compressed in a highly efficient manner by means of predictive coding.

The algorithm of the adaptive arithmetic coding is described below. In the adaptive arithmetic coding, the predictive coding process including generation of differential information and arithmetic coding is performed in a single step thereby achieving an improvement in the codeword efficiency. In the conventional arithmetic coding, codewords are generally produced using a single occurrence probability table. In the dynamic arithmetic coding, the occurrence probability table is updated each time one word is coded. In contrast, in the adaptive arithmetic coding, there are as many arithmetic tables (decoding tables) as the amount of predicted information, and a proper table is selected by a table selector from the plurality of tables. The coding is performed using the selected table. Thus, data such as image information is compressed in a highly efficient manner by means of predictive coding.

Figure 3:
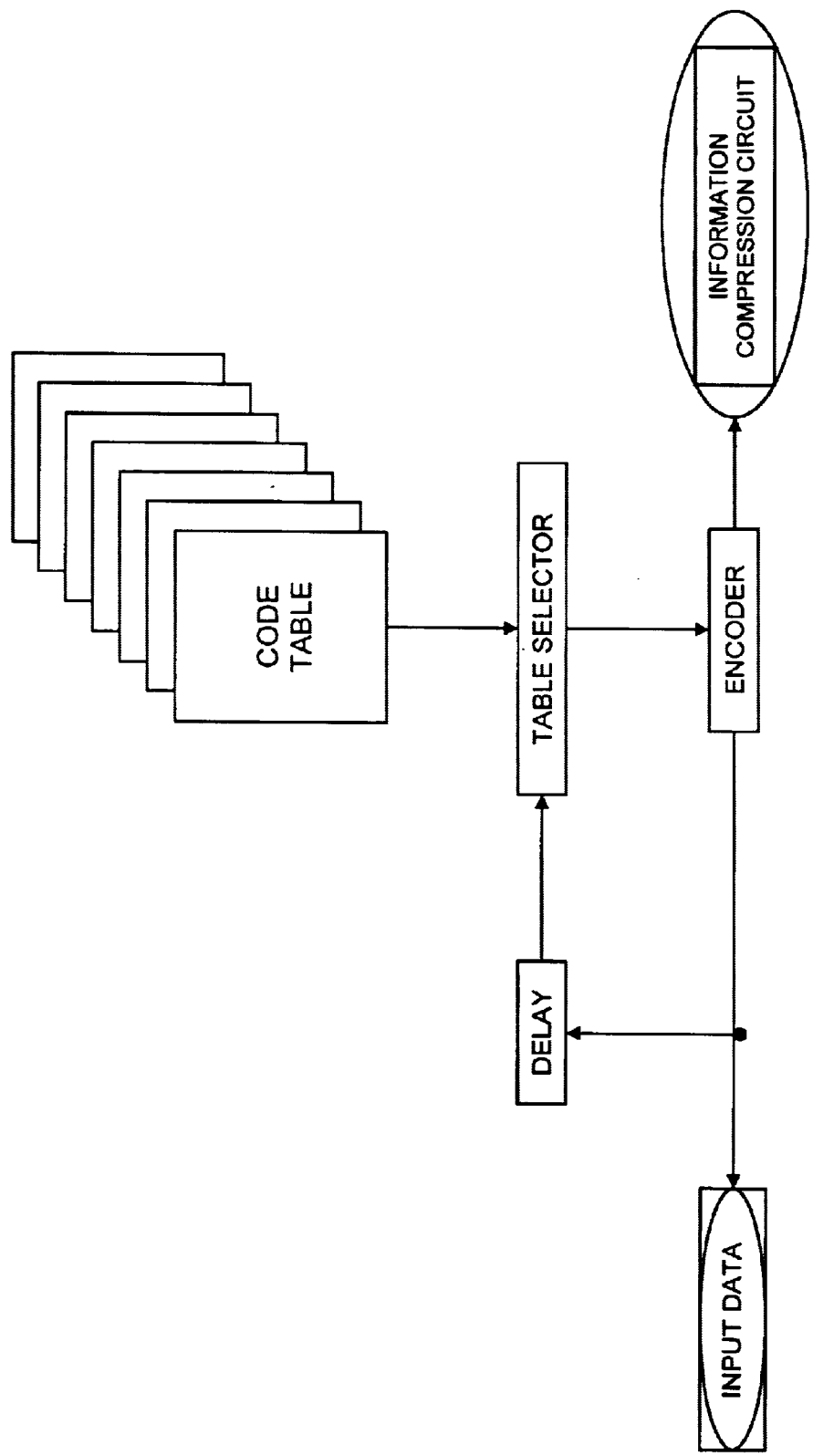
FIG. 3 is a block diagram of an encoder.
Figure 4:
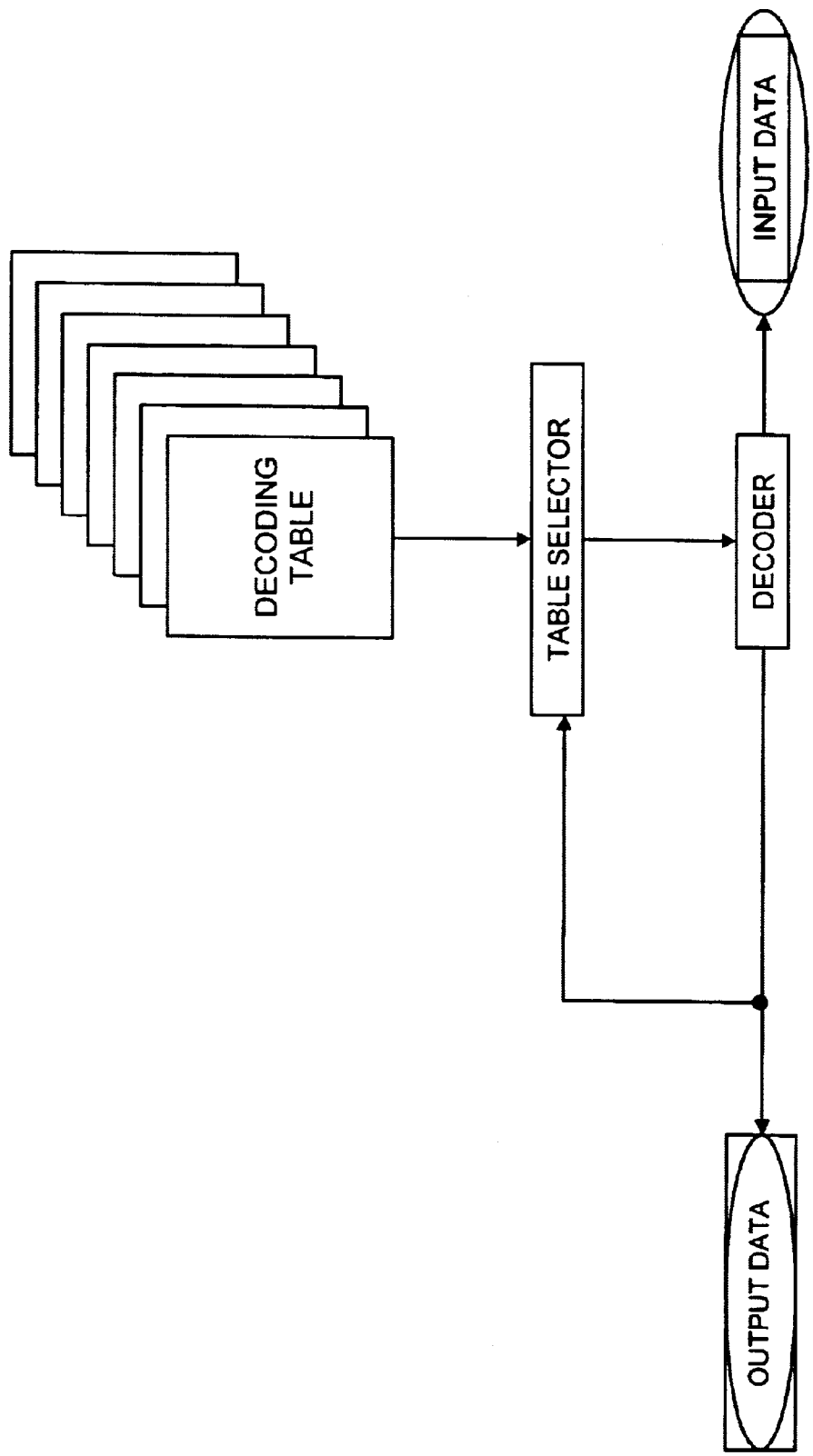
FIG. 4 is a circuit diagram of a decoder.

In the adaptive conversion coding for a motion image, coding is performed after scaling the conversion factors by means of a feedback control in accordance with the filled factor of a transmission buffer memory. In this technique, in accordance with the histogram of conversion factors for a typical image, a threshold value for determining non-significant factors corresponding to signal values which are not coded, a run length code used to encode the continuity of the non-significant factors, and a Huffman coding table used to encode the significant factors are determined, and coding is performed in accordance with them. FIG. 3 illustrates a specific example of a predictive coding circuit. As shown in FIG. 3, input image data which has been converted into a digital form by means of analog-to-digital conversion is applied to a table selector after being delayed. This image data is coded and compared with image data which is directly applied to an encoder. The table selector selects a code table from a plurality of code tables in accordance with the predicted information and sends the selected code table to an encoder. The encoder converts the input image data into an adjusted codeword thereby compressing the input image data. FIG. 4 illustrates a specific example of a predictive decoding circuit. As shown in FIG. 4, a codeword is sent to a decoder. The codeword which has been sent directly to the decoder is sent to a table selector. The table selector selects a decoding table from a plurality of decoding tables in accordance with predicted information and sends the selected decoding table to the decoder. The decoder determines the difference with respect to the pixel value which has already been decoded thereby obtaining adjusted image data.

As can be seen from the above description, the present invention has great advantages. In particular, by removing the block conversion, it becomes possible to compress information by means of predictive coding with a high compression ratio and at a high speed while maintaining high image and sound quality. In the conventional technique, if there is a large difference between frames, significant degradation in image quality occurs. In contrast, in the present invention, degradation in image quality is suppressed by groping pixels into blocks each including 2×2 pixels and treating pixels on a block-by-block basis. This technique according to the present invention prevents the image quality from having abrupt degradation even when the difference exceeds the intrablock threshold value. That is, the technique according to the present invention allows the image quality to vary in a linear fashion. Thus, it becomes possible to control the communication bit rate without resulting in significant degradation in image quality. Furthermore, it is possible to increase the compression ratio by −20% to 50% while maintaining the apparent image quality at substantially the same level. Furthermore, the adaptive Huffman compression process or the adaptive arithmetic compression process may be performed in such a manner that the generation of differential information and the Huffman coding process, or the generation of differential information and the arithmetic coding process are performed in one step thereby achieving highly efficient use of codewords and thus achieving highly efficient coding by means of predictive coding.

According to a method of compressing motion image information of the present invention, comparing spatially or temporally adjacent pixels to each other is made which is followed by outputting differential information thereby reducing redundant information between frames. The method includes the steps of comparing corresponding pixels to each other between frames, detecting an area where the absolute values of pixel differences are greater than a given parameter, and storing the detected area and the other area into the form of a 1-bit bit map. Then compression of information in the area where the absolute values of pixel differences are greater than the parameter is made. By the foregoing method, motion image information can be efficiently compressed.

According to another aspect of a method of compressing motion image information of the present invention, compressing motion image information by means of comparing spatially or temporally adjacent pixels is made to each other and outputting differential information occurs thereby reducing redundant information between frames. The method includes the steps of: comparing corresponding pixels to each other between frames, detecting an area where the absolute values of pixel differences are greater than a given parameter, and storing the detected area and the other area into the form of a 1-bit bit map; and compressing information in the area where the absolute values of pixel differences are greater than the parameter and processing (deleting) the other area, where the absolute values of pixel differences are not greater than the parameter, as an area where there is no change in pixel value between frames. By the foregoing method, motion image information may be efficiently compressed.

According to still another aspect of the present invention, the compression system may compress motion image information, including entropy coding circuit 6 that reduces redundant information between frames by means of comparing spatially or temporally adjacent pixels to each other and outputting differential information. The system may also include a bit map information storage circuit 4 that compares pixels t and corresponding pixels t−1 to each other between frames pixel by pixel, detects an area where the absolute values of pixel differences are greater than a given parameter, and stores the area and the other area into the form of a 1-bit bit map. An information compression circuit 5 may compress information in the area indicated, by the bit map stored in the bit map information storage circuit, as being greater in the absolute difference value between pixels t and t−1 than the parameter P. By the foregoing system, motion image information may be efficiently compressed.

According to still another aspect of the present invention, a system for compressing motion image information may be provided. The system includes entropy coding circuit that reduces redundant information between frames by means of comparing spatially or temporally adjacent pixels to each other and outputting differential information. The system may further include bit map information storage circuit for comparing pixels t and corresponding pixels t−1 to each other between frames pixel by pixel, detecting an area where the absolute values of pixel differences are greater than a given parameter, and storing the area and the other area into the form of a 1-bit bit map; and information compression circuit that may compress information in the area indicated, by the bit map stored in the bit map information storage circuit, as being greater in the absolute difference value between pixels t and t−1 than the parameter P, and for processing (deleting) pixels in the other area as those having no change between frames. By the foregoing system, motion image information may be efficiently compressed.

Furthermore, the 1-bit bit map information stored in the bit map information storage circuit can be compressed by means of a binary image coding method such as, but not limited to, a run length, modified READ (MR, MMR), modified Huffman (MH), or JBIG coding method, thereby making it possible to compress image information in a highly efficient manner by means of predictive coding. This allows an improvement in image quality in digital facsimile transmission or the like using a public telephone network.

In the information compression circuit for compressing information in the area where the absolute difference values are greater than the given parameter P, information compression is performed by means of an adaptive Huffman coding process including as many Huffman tables as the amount of predicted information. The table selector selects a table from the plurality of tables in accordance with the predicted information, and coding is performed using the selected table. Thus it becomes possible to compress image information in a highly efficient manner by means of predictive coding.

The entropy coding circuit 6 includes adaptive arithmetic coding circuit which has as many arithmetic tables as the amount of predicted information and which performs coding in accordance with an arithmetic table selected from the plurality of arithmetic tables. The table selector selects a table from the plurality of tables in accordance with the predicted information, and coding is performed using the selected table. Thus it becomes possible to compress image information in a highly efficient manner by means of predictive coding.

Furthermore, the present invention also provides the method of compressing motion image information by means of comparing spatially or temporally adjacent pixels to each other and outputting differential information thereby reducing redundant information between frames, wherein the method includes the steps of: comparing pixels treated on a block-by-block basis, each block including 2×2 pixels, with corresponding pixels of another frame, detecting an area where the absolute values of differences are greater than a given parameter P, and storing the detected area and the other area into the form of a 1-bit bit map; and compressing information in the area where the absolute values of differences are greater than the parameter P. This allows motion image information to be compressed in a highly efficient fashion while maintaining image and sound quality.

Furthermore, the present invention also provides a method of compressing motion image information, by means of comparing spatially or temporally adjacent pixels to each other and outputting differential information thereby reducing redundant information between frames, wherein the method includes the steps of: comparing pixels treated on a block-by-block basis, each block including 2×2 pixels, with corresponding pixels of another frame, detecting an area where the absolute values of differences are greater than a given parameter P, and storing the detected area and the other area into the form of a 1-bit bit map; and compressing information in the area where the absolute values of differences are greater than the parameter P and processing (deleting) the other area, where the absolute values of pixel differences are not greater than the parameter, as an area where there is no change in pixel value between frames. This also allows motion image information to be compressed in a highly efficient fashion while maintaining image and sound quality.

When 2×2 pixel data input to an encoder between frames are represented by A, B, C, and D, output data a, b, c, and d are determined and a 2×2 bitmap is produced such as a=A+B+C+D, b=A−B+C−D, c=A+B−C−D, and d=a−4D, and wherein decoded output data is produced such as $3A \approx a+b+c=3A+B+C-D$, $3B \approx a-b+c=A+3B-C+D$, $3C \approx a+b-c=A-B+3C+D$, $3D \approx a-b-c=-A+B+C+3D$. Thus, reproduced data has an intermediate property between that obtained by passing original data through a smoothing filter and that obtained through an edge extraction filter (more similar to that obtained via the and edge extraction filter), and a ¼ error is diffused over the entire data. This makes it possible to reproduce an image using as small as ¾ of data so that the resultant reproduced image becomes similar to that obtained by passing its original data through filters.

The intraframe difference presence/absence information is given in the form of bitmap information corresponding to respective 2×2 blocks in a frame, wherein it is determined whether there is a difference between frames by comparing the root-mean-square error of (three) data input to an encoder, that is $((A-A')^2+(B-B')^2+(C-C')^2)^{1/2}$, with the parameter, and, if it is determined that there is a difference between frames, a corresponding bit of the intraframe difference presence/absence information is set. This technique prevents the image quality from having abrupt degradation even when the difference exceeds the intrablock threshold value. That is, the technique according to the present invention allows the image quality to vary in a linear fashion. Thus, it becomes possible to control the communication bit rate without resulting in significant degradation in image quality. Furthermore, it is possible to increase the compression ratio by −20% to 50% while maintaining the apparent image quality at substantially the same level.

Furthermore, the 1-bit bitmap information stored in the bitmap is compressed by means of a binary image coding method such as a run length, modified READ (MR, MMR), modified Huffman (MH), or JBIG coding method, thereby making it possible to compress image information or audio information in a highly efficient manner by means of predictive coding. This allows an improvement in image quality in digital facsimile transmission or the like using a public telephone network.

Furthermore, information in the area where the absolute difference values are greater than the parameter P is compressed by means of an adaptive Huffman coding process including as many Huffman tables as the amount of predicted information. The table selector selects a table from the plurality of tables in accordance with the predicted information, and coding is performed using the selected table. Thus, data such as image information or audio information is compressed in a highly efficient manner by means of predictive coding.

The present invention also provides a system for compressing motion image information, including entropy coding circuit 6 for reducing redundant information between frames by means of comparing spatially or temporally adjacent pixels to each other and outputting differential information, wherein the system includes: bitmap information storage circuit 4 for comparing pixels t treated on a block-by-block basis, each block including 2×2 pixels, with corresponding pixels t−1 of another frame, detecting an area where the absolute values of differences are greater than a given parameter, and storing the detected area and the other area into the form of a 1-bit bit map; and information compression circuit 5 for compressing information in the area indicated, by the bitmap stored in the bitmap information storage circuit 4, as being greater in the absolute difference value between pixels t and t−1 than the parameter. This allows motion image information to be compressed in a highly efficient manner while maintaining image and sound quality at a high level.

The present invention also provides a system for compressing motion image information, including entropy coding circuit 6 for reducing redundant information between frames by means of comparing spatially or temporally adjacent pixels to each other and outputting differential information, wherein the system includes: bitmap information storage circuit 4 for comparing pixels t treated on a block-by-block basis, each block including 2×2 pixels, with corresponding pixels t−1 of another frame, detecting an area where the absolute values of differences are greater than a given parameter, and storing the detected area and the other area into the form of a 1-bit bit map; and information compression circuit 5 for compressing information in the area indicated, by the bitmap stored in the bitmap information storage circuit, as being greater in the absolute difference value between pixels t and t−1 than the parameter, and for processing (deleting) pixels in the other area as those having no change between frames. This allows motion image information to be compressed in a highly efficient manner while maintaining image and sound quality at a high level.

Herein, the 1-bit bitmap information stored in the bitmap information storage circuit is intraframe difference presence/absence information corresponding to respective 2×2 blocks in a frame, and the intraframe difference presence/absence information is compressed by means of a binary image coding method such as a run length, modified READ (MR, MMR), modified Huffman (MH), or JBIG coding method, thereby making it possible to compress image information or audio information in a highly efficient manner by means of predictive coding. This allows an improvement in image quality in digital facsimile transmission or the like using a public telephone network.

The information compression circuit 5 for compressing information in the area where the absolute difference values are greater than the parameter P performs information compression by means of an adaptive Huffman coding process including as many Huffman tables as the amount of predicted information. The table selector selects a table from the plurality of tables in accordance with the predicted information, and coding is performed using the selected table. Thus, data such as image information or audio information is compressed in a highly efficient manner by means of predictive coding.

The entropy coding circuit 6 includes adaptive arithmetic coding circuit which has as many arithmetic tables as the amount of predicted information and which performs coding in accordance with an arithmetic table selected from the plurality of arithmetic tables. That is, the table selector selects a table from the plurality of tables in accordance with the predicted information, and coding is performed using the selected table. Thus, data such as image information or audio information is compressed in a highly efficient manner by means of predictive coding.

The contents of Japanese patent application No. 2000-169680 is incorporated herein by reference in its entirety.

What is claimed is:

1. A method of compressing motion image information, by means of comparing spatially or temporally adjacent pixels to each other and outputting differential information thereby reducing redundant information between frames, said method comprises steps of:

comparing corresponding pixels to each other between frames, detecting a first area where absolute values of pixel differences are greater than a given parameter, and storing said first area and a second area other than the first area into a form of a 1-bit bit map; and compressing information in said first area where the absolute values of pixel differences are greater than said parameter.

2. A method of compressing motion image information, by means of comparing spatially or temporally adjacent pixels to each other and outputting differential information thereby reducing redundant information between frames, said method comprises steps of:

comparing corresponding pixels to each other between frames, detecting a first area where absolute values of pixel differences are greater than a given parameter, and storing said first area and a second area other than the first area into a form of a 1-bit bit map; and compressing information in the first area and processing (deleting) the second area as an area where there is no change in pixel value between frames.

3. The method of compressing motion image information according to claim 1 or 2, wherein the 1-bit bit map information stored is compressed by means of a binary image coding method selected at least from a run length, modified READ (MR, MMR), modified Huffman (MH), and JBIG coding method.

4. The method of compressing motion image information according to claim 1 or 2, wherein the information in the first area is compressed by means of an adaptive Huffman coding process which includes a plurality of Huffman tables as amount of predicted information.

5. A system for compressing motion image information, including entropy coding circuit that reduces redundant information between frames by means of comparing spatially or temporally adjacent pixels t and t–1 to each other and outputting pixel differential information, said system comprising:

bit map information storage circuit that compares the pixels t and the pixels t–1 to each other between the frames, outputting the pixel differential information, detecting a first area where the absolute values of the pixel differential information are greater than a given parameter, and storing said first area and a second area other than the first area into a form of a 1-bit bit map; and information compression circuit that compresses information in said first area.

6. A system for compressing motion image information, including entropy coding circuit that reduces redundant information between frames by means of comparing spatially or temporally adjacent pixels t and t–1 to each other and outputting differential information, said system comprising:

bit map information storage circuit for comparing pixels t and pixels t–1 to each other between frames, detecting a first area where the absolute values of pixel differences are greater than a given parameter, and storing said first area and a second area other than the first area into a form of a 1-bit bit map; and information compression circuit that compresses information in said first area, and that processes (deletes) pixels in the second area as those having no change between frames.

7. A system for compressing motion image information according to claim 5 or 6, wherein the 1-bit bit map information stored in said bit map information storage circuit is compressed by means of a binary image coding method at least one selected from a run length, modified READ (MR, MMR), modified Huffman (MH), and JBIG coding method.

8. A system for compressing motion image information according to claim 5 or 6, wherein said information compression circuit that compresses information in the first area performs said information compression by means of an adaptive Huffman coding process including a plurality of Huffman tables as amount of predicted information.

9. A system for compressing motion image information, according to claim 5 or 6, wherein said entropy coding circuit comprises adaptive arithmetic coding circuit which has as a plurality of arithmetic tables corresponding to an amount of predicted information and which performs coding in accordance with one of the arithmetic tables.

10. A method of compressing motion image information, by means of comparing spatially or temporally adjacent pixels to each other and outputting differential information thereby reducing redundant information between frames, said method including the steps of:

comparing pixels treated on a block-by-block basis, each block including 2×2 pixels, with corresponding pixels of another frame, detecting an area where the absolute values of differences are greater than a given parameter, and storing the detected area and the other area into the form of a 1-bit bit map; and compressing information in the area where the absolute values of pixel differences are greater than the parameter.

11. A method of compressing motion image information, by means of comparing spatially or temporally adjacent pixels to each other and outputting differential information thereby reducing redundant information between frames, said method including the steps of:

comparing pixels treated on a block-by-block basis, each block including 2×2 pixels, with corresponding pixels of another frame, detecting an area where the absolute values of differences are greater than a given parameter, and storing the detected area and the other area into the form of a 1-bit bit map; and compressing information in said area where the absolute values of pixel differences are greater than said parameter and processing (deleting) said other area, where the absolute values of pixel differences are not greater than said parameter, as an area where there is no change in pixel value between frames.

12. A method of compressing motion image information, according to claim 10 or 11, wherein when 2×2 pixel data input to an encoder between frames are represented by A, B, C, and D, output data a, b, c, and d are determined and a 2×2 bitmap is produced such as a=A+B+C+D, b=A−B+C−D, c=A+B−C−D, and d=a−4D, and wherein decoded output data is produced such as $3A \approx a+b+c=3A+B+C-D$, $3B \approx a-b+c=A+3B-C+D$, $3C \approx a+b-c=A-B+3C+D$, and $3D \approx a-b-c=-A+B+C+3D$.

13. A method of compressing motion image information, according to claim 10 or 11, wherein intraframe difference presence/absence information is given in the form of bitmap information corresponding to respective 2×2 blocks in a frame, and wherein it is determined whether there is a difference between frames by comparing the root-mean-square error of (three) data input to an encoder, that is $((A-A')^2+(B-B')^2+(C-C')^2)^{1/2}$, with a parameter, and, if it is determined that there is a difference between frames, a corresponding bit of said intraframe difference presence/absence information is set.

14. A method of compressing motion image information, according to claim 10 or 11, wherein the 1-bit bitmap information stored in the bitmap is compressed by means of a binary image coding method such as a run length, modified READ (MR, MMR), modified Huffman (MH), or JBIG coding method.

15. A method of compressing motion image information, according to claim 10 or 11, wherein information in the area where the absolute difference values are greater than said parameter is compressed by means of an adaptive Huffman coding process including as many Huffman tables as the amount of predicted information.

16. A system for compressing motion image information, including entropy coding circuit that reduces redundant information between frames by means of comparing spatially or temporally adjacent pixels to each other and outputting differential information, said system including:

bitmap information storage circuit for comparing pixels t treated on a block-by-block basis, each block including 2×2 pixels, with corresponding pixels t−1 of another frame, detecting an area where the absolute values of differences are greater than a given parameter, and storing the detected area and the other area into the form of a 1-bit bit map; and information compression circuit for compressing information in the area indicated, by the bitmap stored in the bitmap information storage circuit, as being greater in the absolute difference value between pixels t and t−1 than the parameter.

17. A system for compressing motion image information, including entropy coding circuit for reducing redundant information between frames by means of comparing spatially or temporally adjacent pixels to each other and outputting differential information, said system including:

bitmap information storage circuit for comparing pixels t treated on a block-by-block basis, each block including 2×2 pixels, with corresponding pixels t−1 of another frame, detecting an area where the absolute values of differences are greater than a given parameter, and storing the detected area and the other area into the form of a 1-bit bit map; and information compression circuit for compressing information in the area indicated, by the bitmap stored in the bitmap information storage circuit, as being greater in the absolute difference value between pixels t and t−1 than the parameter, and for processing (deleting) pixels in the other area as those having no change between frames.

18. A system for compressing motion image information, according to claim 16 or 17, wherein the 1-bit bitmap information stored in the bitmap information storage circuit is intraframe difference presence/absence information corresponding to respective 2×2 blocks in a frame, and said intraframe difference presence/absence information is compressed by means of a binary image coding method such as a run length, modified READ (MR, MMR), modified Huffman (MH), or JBIG coding method.

19. A system for compressing motion image information, according to claim 16 or 17, wherein said information compression circuit for compressing information in the area where the absolute difference values are greater than said parameter performs said information compression by means of an adaptive Huffman coding process including as many Huffman tables as the amount of predicted information.

20. A system for compressing motion image information, according to claim 16 or 17, wherein said entropy coding circuit includes adaptive arithmetic coding circuit which has as many arithmetic tables as the amount of predicted information and which performs coding in accordance with,an arithmetic table selected from said plurality of arithmetic tables.

* * * * *